J. C. DICKEY.
MACHINERY FOR WASHING AND AMALGAMATING GOLD.

No. 29,771.                      Patented Aug. 28, 1860.

Witnesses.                        Inventor

UNITED STATES PATENT OFFICE.

JULIUS C. DICKEY, OF SARATOGA SPRINGS, NEW YORK.

GOLD WASHER AND AMALGAMATOR.

Specification of Letters Patent No. 29,771, dated August 28, 1860.

*To all whom it may concern:*

Be it known that I, JULIUS C. DICKEY, of Saratoga Springs, in the county of Saratoga and State of New York, have invented a new and Improved Mode of Constructing Machinery for Washing and Amalgamating Gold; and I do hereby declare that the following is a full and exact description thereof, reference being had to the accompanying drawings and to the letters of reference marked thereon.

The nature of my invention consists in the employment of a hollow revolving cone, or shell, made with one or more projections on the base and under side of the same, in combination with a stationary cone made with one or more channels, one below the other, on the base of the same; having the said revolving cone work on the said stationary cone, and the said projections work in the said channels, for the purpose of washing and amalgamating gold.

Figure 1:
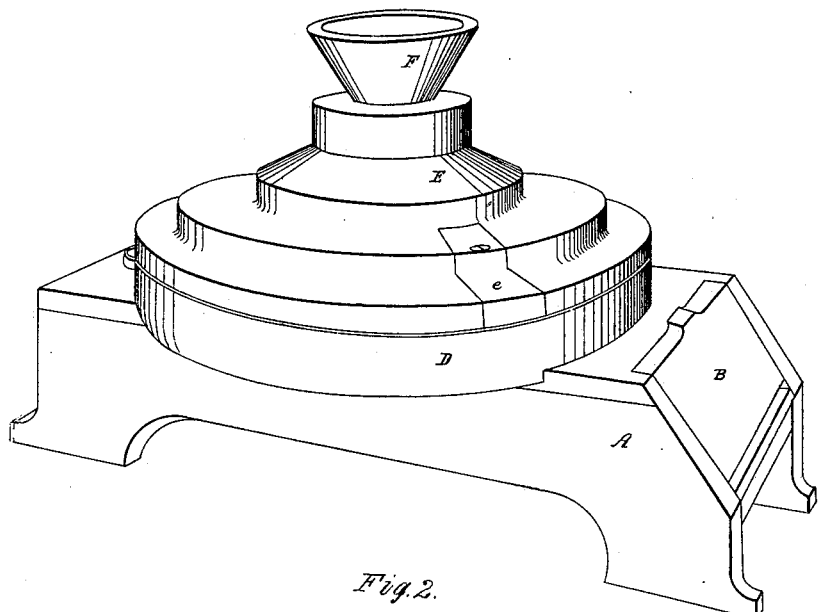
Figure 2:
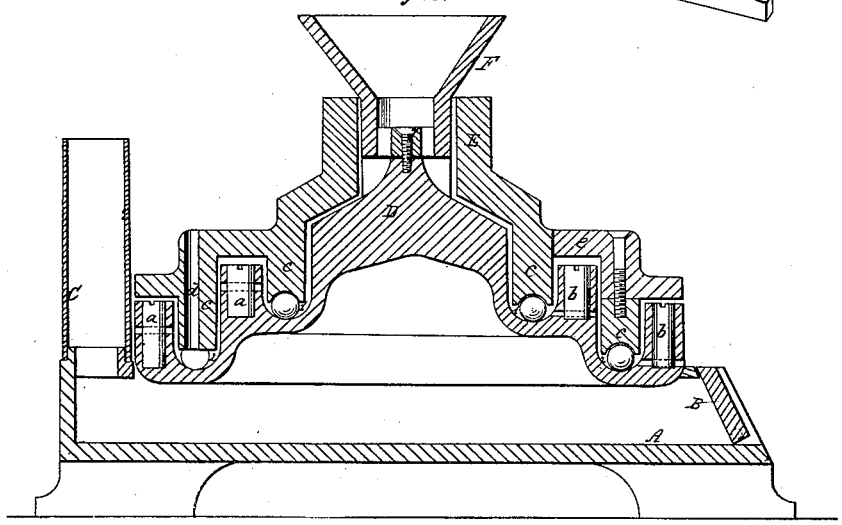

Figure 1 shows a perspective view, and Fig. 2 a cross section.

Similar letters refer to like parts.

I make under the base of the stationary cone a stove; or an arrangement for heating the pulverized quartz, earth, water &c. in the said channels, the whole machinery being made of iron.

In Fig. 2 A shows the stove, B the door of the same, and C the pipe; D, the stationary cone with the channels Nos. 1 and 2; E, the revolving cone and F, the hopper.

The stove A which is cast on the base of the said stationary cone is bolted to a firm foundation, and the bottom of the said stove is made with a grate when coal is used for heating the water &c. in the channels.

I design to make the said stove in some cases with an oven and griddle hole for the purpose of cooking—this being desirable in small machines and when they are used distant from any settlements.

The stationary cone D and also the revolving cone, as shown at the dotted lines, I make with and without grinding surfaces. Channel No. 1 I make more elevated than channel No. 2, so that water in channel No. 1, when it rises up to the top of the projection which separates the channels will flow over the said projection into channel No. 2. On a working machine I make on the base of the said stationary cone from six to twelve channels so that quartz, earth &c. will be thoroughly worked and washed, and also for the purpose of securing a complete amalgamation of the gold. I make the said channels of such form and size as will be best adapted to the purposes for which they are intended.

The stop-cocks *a a* are for the purpose of letting the water out of the channels when it is desirable to remove the gold, and the stop-cocks *b b* are for the purpose of letting the quick-silver—with which the gold is amalgamated—out of said channels. The said stop-cocks I make in any well known and convenient manner, and so as to secure the end for which they are intended.

I give motion to the revolving cone E by means of suitable gearing connected with the stationary cone; or in any other and desirable manner; and so that hand, horse, and steam power may be used in working the machine.

Under the projections *c*, on the said revolving cone, I secure round balls; which balls roll in the said channels, and support the said revolving cone. The object of these balls is to give motion to the revolving cone with less power than would be necessary without them, and also to pulverize quartz, sand &c., and assist in the amalgamation of the gold. I make projections on the said projections, so as to cut into and thoroughly stir up clay, cement, sand &c. that may be worked in the machine. These projections *c*, perform a very important office in the washing and amalgamation of gold. They serve to force all small particles of gold into the bottoms of the channels in contact with quick-silver, and also to separate the gold from all impurities so that it can be amalgamated. It is a well known fact that much gold in small particles is lost by being washed away before it—the gold—comes in contact with quick-silver, and it is one of the important offices performed by these projections *c* in saving this fine gold.

The hole *d*, made in the revolving cone E is for the purpose of inserting an adjustable rod to stir up the earth, water &c. in the channels and assist in amalgamation. An adjustable piece *e*, on the revolving cone E, is removed when it is desirable to turn the stop-cocks to remove the gold in the channels. I make a stop-cock on the outside, for channel No. 2, when motion is given to the revolving cone by means of gearing, and it is necessary to make cogs on the outside edge of the revolving cone. The hopper F, is secured on top of the stationary cone—inside of the revolving cone—by means of a set-screw passing through the bottom of the same into the said cone. It is made with openings both sides of the set-screw so that pulverized quartz, sand &c. will pass through between the cones and into the channels.

The hopper, as shown in the drawing, shows the openings in a position to allow the sand &c. to pass through into the channels; but, when the said hopper is turned in an opposite direction the openings are partially, or entirely closed, so that any desirable quantity of sand &c. can be let into the machine. This hopper may be made with a sieve, or without so as to be adapted to the material worked.

It is designed to use this machine mostly for working sand, clay, cement, and the tailings of an ordinary stamping machine. When clay and cement containing gold is worked upon the use of the hopper is discontinued, and the opening at the top is made larger, with projections on the said cones in the said opening for the purpose of cutting and breaking up the clay &c.; and when thus used quartz not extremely hard may be worked also.

This arrangement for heating the quartz, earth, water, &c. is an important addition to this kind of machinery, as it aids very materially in separating the gold from all impurities, and also secures a more complete amalgamation of the gold, it—the arrangement for heating the quartz, water, &c., in the said channels—being the same as used in the construction of the quartz crushing machines patented by me May sixteenth 1860.

*Operation.*—Sand being put into hopper F, passes into the machine between the cones—as shown by the dotted lines—where it is pulverized by the action of the said cones and forced by the projections into channel No. 1, and in contact with quick silver, where it is more finely pulverized by the action of the balls, and where the gold is separated from impurities and amalgamated. When channel No. 1 is filled with water, sand &c. up to the top of the projection which separates the channels it flows over the said projection into channel No. 2, where the quartz &c. is more finely pulverized, and where the gold is amalgamated as aforesaid—the water and quick-silver being withdrawn from the channels as aforesaid.

The main and important features of this invention are the projections $c$ working in one or more channels, as aforesaid, with the pulverizing surfaces of the cones and balls, and also the arrangement for heating the water &c. in said channels whereby warm amalgamation is secured.

I claim—

The projections $c$ made on the base and under side of the revolving cone E, working in one or more channels made on the base of the stationary cone D, for the purposes set forth.

JULIUS C. DICKEY.

Witnesses:
 THOMAS CLARK,
 BILLINCE BUCK.